(12) United States Patent
Lim et al.

(10) Patent No.: US 10,804,527 B2
(45) Date of Patent: Oct. 13, 2020

(54) POSITIVE ELECTRODE ACTIVE MATERIAL FOR RECHARGEABLE LITHIUM BATTERY, METHOD FOR MANUFACTURING SAME, AND RECHARGEABLE LITHIUM BATTERY INCLUDING SAME

(71) Applicant: Seoul National University R&DB Foundation, Seoul (KR)

(72) Inventors: Jin-Myoung Lim, Osan-si (KR); Duho Kim, Seoul (KR); Maenghyo Cho, Seoul (KR); Kyeong-jae Cho, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 332 days.

(21) Appl. No.: 15/575,427

(22) PCT Filed: Dec. 22, 2015

(86) PCT No.: PCT/KR2015/014109
§ 371 (c)(1),
(2) Date: Apr. 23, 2018

(87) PCT Pub. No.: WO2016/186285
PCT Pub. Date: Nov. 24, 2016

(65) Prior Publication Data
US 2018/0254473 A1 Sep. 6, 2018

(30) Foreign Application Priority Data
May 18, 2015 (KR) .................. 10-2015-0068950

(51) Int. Cl.
*H01M 4/131* (2010.01)
*H01M 4/505* (2010.01)
(Continued)

(52) U.S. Cl.
CPC ......... *H01M 4/131* (2013.01); *H01M 4/1391* (2013.01); *H01M 4/485* (2013.01);
(Continued)

(58) Field of Classification Search
CPC ............................. C01G 45/12; C01G 51/40
See application file for complete search history.

(56) References Cited

U.S. PATENT DOCUMENTS

| 5,240,794 A | 8/1993 | Thackeray et al. |
| 2003/0180616 A1 | 9/2003 | Johnson et al. |

(Continued)

FOREIGN PATENT DOCUMENTS

| KR | 10-2008-0021710 | 3/2008 |
| KR | 10-1182271 | 9/2012 |
| KR | 10-2015-0028206 | 3/2015 |

OTHER PUBLICATIONS

Ceder, G. et al., "The stability of orthorhombic and monoclinic-layered LiMn02", Electrochemical and Solid-State Letters, Second Edition, No. 11, pp. 550-552, 1999.
(Continued)

*Primary Examiner* — Jeremiah R Smith
(74) *Attorney, Agent, or Firm* — Lex IP Meister, PLLC

(57) ABSTRACT

Disclosed are a positive active material for a rechargeable lithium battery, a method of manufacturing the same, and a rechargeable lithium battery including the same. More specifically, the positive active material for a rechargeable lithium battery is a compound having an orthorhombic layered structure represented by the following Chemical Formula 1 or a compound represented by the following Chemical Formula 2, a method for producing the same, and a rechargeable lithium battery including the same.

$Li_{1+x}M_yO_{2+z}$ [Chemical Formula 1]

$\{_m(Li_{1+x}M_yO_{2+z})\}\cdot\{_{1-m}(LiMO_2)\}$ [Chemical Formula 2]

(Continued)

Wherein, in the above Chemical Formula 1 or Chemical Formula 2, M is one or more elements selected from the group consisting of Mn, Co, Ni, Al, Ti, Mo, V, Cr, Fe, Cu, Zr, Nb, and Ga, $0.7 \leq x \leq 1.2$, $0.8 \leq y \leq 1.2$, $-0.2 \leq z \leq 0.2$, and $0 < m \leq 1$.

8 Claims, 3 Drawing Sheets

(51) Int. Cl.
*H01M 4/485* (2010.01)
*H01M 10/052* (2010.01)
*H01M 4/525* (2010.01)
*H01M 4/1391* (2010.01)
*C01G 51/00* (2006.01)
*C01G 45/12* (2006.01)
*H01M 4/02* (2006.01)

(52) U.S. Cl.
CPC ........... *H01M 4/505* (2013.01); *H01M 4/525* (2013.01); *H01M 10/052* (2013.01); *C01G 45/12* (2013.01); *C01G 45/1228* (2013.01); *C01G 51/40* (2013.01); *C01G 51/50* (2013.01); *H01M 2004/021* (2013.01); *H01M 2004/028* (2013.01)

(56) References Cited

U.S. PATENT DOCUMENTS

2006/0051671 A1  3/2006  Thackeray et al.
2013/0171524 A1* 7/2013  Cho .................. H01M 4/485
                                                   429/221

OTHER PUBLICATIONS

Johnson, C. S. et al., "The role of Li2MO2 structures (M=metal ion) in the electrochemistry of (x) LiMn0.5Ni0.5O2 (1-x)Li2TiO3 electrodes for lithium-ion batteries", Electrochemistry Communications, 4, pp. 492-498, 2002, Elsevier.

Cho, J. et al., "The Effect of a Metal-Oxide Coating on the Cycling Behavior at 55C in Orthorhombic LiMnO2 Cathode Materials", Journal of the Electrochemical Society, 149 (3), A288-A292, 2002, ECS.

* cited by examiner

| Elements | ppm [mg/Kg] | Weight [g] | wt.% [%] | mol% [%] | mol Fraction |
|---|---|---|---|---|---|
| Li | 106073.4 | 8.26 | 10.61 | 119.02 | 1.92 |
| Mn | 437445.8 | 34.07 | 43.74 | 62.01 | 1.00 |

[Fig. 5]

POSITIVE ELECTRODE ACTIVE MATERIAL FOR RECHARGEABLE LITHIUM BATTERY, METHOD FOR MANUFACTURING SAME, AND RECHARGEABLE LITHIUM BATTERY INCLUDING SAME

BACKGROUND OF THE INVENTION (a) Field of the Invention

A positive active material for a rechargeable lithium battery, a method for manufacturing the same, and a rechargeable lithium battery including the same are disclosed.

(b) Description of the Related Art

In recent times, rechargeable lithium batteries have been widely used as power sources for driving various small electronic equipment. In recent years, demand for rechargeable lithium batteries has rapidly increased in large-sized fields such as hybrids, plug-in hybrids, and transportation vehicles, and it is urgent to develop rechargeable lithium batteries equipped with them.

Meanwhile, in a rechargeable lithium battery, lithium which has been inserted into the positive electrode during charging is transferred to the negative electrode. On the other hand, in discharging, lithium inserted into the negative electrode is transferred to the positive electrode. Graphite is used as the negative electrode of most commercial batteries, and the positive electrode includes lithium cobalt oxide ($LiCoO_2$).

Generally, graphite and lithium cobalt oxide ($LiCoO_2$) are used as the negative active material and the positive active material, respectively. When the battery including the negative active material and the positive active material is actually driven, graphite, which is a negative active material, realizes a capacity of about 350 mAh/g and lithium cobalt oxide ($LiCoO_2$), a positive active material, realizes a capacity of about 140 mAh/g, which is about 50% of its theoretical capacity.

Thus, in order to resolve the problem that lithium cobalt oxide ($LiCoO_2$) as a positive active material does not reach graphite as a negative active material, it is necessary to develop a positive active material capable of realizing high capacity and high energy density.

In this connection, although a composite positive active material ($_mLi_2MO_3 \cdot _{1-m}LiMO_2$) has been proposed, the reactivity of $Li_2MnO_3$, which is generally used as a main component thereof, is extremely small, and thus the expression capacity is limited.

DETAILED DESCRIPTION

In order to solve the above-mentioned problem, the present inventors propose a compound having a layer structure which is superior in reactivity to a positive active material represented by the formula $Li_2MnO_3$ while containing lithium in an excess amount, and a method of producing the same by a reduction method. Specifically, one embodiment of the present invention can provide a positive active material for a rechargeable lithium battery, which is a compound having a layer structure represented by the following Chemical Formula 1.

$$Li_{1+x}M_yO_{2+z} \quad \text{[Chemical Formula 1]}$$

Another embodiment of the present invention provides a positive active material for a rechargeable lithium battery, which is a compound having a layer structure represented by the following Chemical Formula 2.

$$\{_m(Li_{1+x}M_yO_{2+z})\} \cdot \{_{1-m}(LiMO_2)\} \quad \text{[Chemical Formula 2]}$$

Another embodiment of the present invention provides a method of manufacturing the positive active material for a rechargeable lithium battery, including: preparing Mixture 1 by mixing a compound represented by Chemical Formula 3 and a carbon-based material; and heat-treating the Mixture 1.

$$Li_{1+x}M_yO_{3+z} \quad \text{[Chemical Formula 3]}$$

In the above Chemical Formula 1 to Chemical Formula 3, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, $-0.2 \leq z \leq 0.2$, and $0 < m \leq 1$. In yet another embodiment of the present invention, a rechargeable lithium battery that includes one of the above positive active materials for a rechargeable lithium battery is provided.

One embodiment of the present invention provides a positive active material compound having a layer structure represented by the following Chemical Formula 1.

$$Li_{1+x}M_yO_{2+z} \quad \text{[Chemical Formula 1]}$$

In the above Chemical Formula 1, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, and $-0.2 \leq z \leq 0.2$. Specifically, the layer structure is an orthorhombic layered structure. More specifically, in the above Chemical Formula 1, x may be in a range of $0.8 \leq x \leq 1.2$, y may be in a range of $0.8 \leq y \leq 1.2$, and M may be Mn.

Another embodiment of the present invention provides a positive active material compound having a layer structure represented by the following Chemical Formula 2.

$$\{_m(Li_{1+x}M_yO_{2+z})\} \cdot \{_{1-m}(LiMO_2)\} \quad \text{[Chemical Formula 2]}$$

In the above Chemical Formula 2, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, $-0.2 \leq z \leq 0.2$, and $0 < m \leq 1$. More specifically, in the above Chemical Formula 2, x may be in a range of $0.8 \leq x \leq 1.2$, y may be in a range of $0.8 \leq y \leq 1.2$, and M may be Mn.

Another embodiment of the present invention provides a method of manufacturing the positive active material for a rechargeable lithium battery, including: preparing Mixture 1 by mixing a compound represented by Chemical Formula 3 and a carbon-based material; and heat-treating the Mixture 1.

$$Li_{1+x}M_yO_{3+z} \quad \text{[Chemical Formula 3]}$$

In the above Chemical Formula 3, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, and $-0.2 \leq z \leq 0.2$. Specifically, the description of the step of preparing the Mixture 1 is as follows. In the above Mixture 1, the weight ratio of the compound represented by the above Chemical Formula 3 to carbon (C) in the above carbon-based material may be 1:0.001 to 1:0.050.

The step of heat-treating the Mixture 1 may be performed in a range of about 300 to about 1000° C.

The step of heat-treating the Mixture 1 may be performed for about 3 to about 40 hours. By the step of heat-treating the Mixture 1, the compound represented by the above Chemical Formula 3 may be reduced to obtain a compound having an orthorhombic layered structure represented by the following Chemical Formula 4.

$$Li_{1+x}M_yO_{2+z}$$ [Chemical Formula 4]

In the above Chemical Formula 4, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, and $-0.2 \leq z \leq 0.2$. After the above step of heat-treating the Mixture 1, the steps of preparing Mixture 2 by mixing the compound having a layer structure represented by Chemical Formula 4 with a lithium metal compound, and heat-treating the Mixture 2 to obtain an over-lithiated positive active material, may be included.

The lithium metal compound may be a compound having a layer structure represented by the following Chemical Formula 5.

$$LiMO_2$$ [Chemical Formula 5]

In the above Chemical Formula 5, M is one or more elements selected from the group consisting of Mn, Co, Ni, Al, Ti, Mo, V, Cr, Fe, Cu, Zr, Nb, and Ga.

More specifically, the description of the step of heat-treating the Mixture 2 to obtain an over-lithiated positive active material is as follows.

In the Mixture 2, the weight ratio of the compound having a layer structure represented by the above Chemical Formula 4 to the above lithium metal compound may be 1:0.001 to 0.001:1.

The step of heat-treating the Mixture 2 to obtain an over-lithiated positive active material may be performed at about 400 to about 1000° C.

The step of heat-treating the Mixture 2 may be performed for about 3 to about 10 hours.

By the above step of heat-treating the Mixture 2, a compound having a layer structure represented by the following Chemical Formula 6 may be obtained as the above over-lithiated positive active material.

$$\{m(Li_{1+x}M_yO_{2+z})\} \cdot \{1-m(LiMO_2)\}$$ [Chemical Formula 6]

In the above Chemical Formula 6, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, $-0.2 \leq z \leq 0.2$, and $0 < m \leq 1$.

Another embodiment of the present invention provides a rechargeable lithium battery including: a positive electrode including the positive active material for the rechargeable lithium battery of any one of the above embodiments; a negative electrode; and an electrolyte.

The positive active material according to an embodiment of the present invention is a compound having an orthorhombic layered structure represented by the following Chemical Formula 1 and containing lithium in an amount equivalent to that of $Li_2MnO_3$, and is excellent in terms of reactivity. The positive active material according to another embodiment of the present invention is a compound having a layer structure represented by the following Chemical Formula 1 which is replaced with $Li_2MO_3$ in a composite positive active material of the form $\{m(Li_2MO_3)\} \cdot \{1-m(LiMO_2)\}$. It can realize higher capacity and higher energy density than the composite positive active material of the form $\{m(Li_2MO_3)\} \cdot \{1-m(LiMO_2)\}$.

The method for manufacturing a positive active material for a rechargeable lithium battery according to another embodiment of the present invention is advantageous for mass production because the manufacturing process is relatively simple.

The rechargeable lithium battery according to another embodiment of the present invention is improved in electrochemical performance by applying the positive active material for the rechargeable lithium battery.

DESCRIPTION

Hereinafter, embodiments of the present invention are described in detail. However, these embodiments are exemplary, and this disclosure is not limited thereto.

One embodiment of the present invention provides a positive active material compound having a layer structure represented by the following Chemical Formula 1.

$$Li_{1+x}M_yO_{2+z}$$ [Chemical Formula 1]

In the above Chemical Formula 1, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, and $-0.2 \leq z \leq 0.2$.

Specifically, the layer structure is an orthorhombic layered structure. The orthorhombic layered structure means a structure having three orthogonal crystal axes of different lengths and having two symmetrical axes parallel to the main axis.

Meanwhile, lithium cobalt oxide ($LiCoO_2$), which is a generally used positive active material, cannot reach the graphite, which is a negative active material, and thus there is a limit in the capacity when applied to a battery. To overcome this problem, $\{m(Li_2MO_3)\} \cdot \{1-m(LiMO_2)\}$ (hereinafter referred to as "composite positive active material") has been used as a positive active material, but as noted above, the composite positive active material is not a fundamental solution due to poor reactivity of $Li_2MnO_3$ that is generally used as a main component thereof.

On the other hand, the compound having a layer structure represented by the above Chemical Formula 1 has an excess of lithium in an amount equivalent to that of $Li_2MnO_3$, and has much better reactivity than that of $Li_2MnO_3$.

Specifically, in the case of Mn contained in $Li_2MnO_3$, the oxidation number is +4, and there are three electrons in 3d orbitals. That is, the Mn contained in $Li_2MnO_3$ has a 3d orbital with a stabilized electron structure without valence electrons, and thus cannot participate in the redox reaction.

On the other hand, in the case of M contained in the compound having a layer structure represented by the above Chemical Formula 1, since the oxidation number thereof is lower than that of $Li_2MnO_3$, valence electrons exist in the 3d orbitals, so that they can participate in the redox reaction.

In this connection, when the compound having a layer structure represented by the above Chemical Formula 1 is $Li_2MnO_2$, the oxidation number of Mn is theoretically +2, and since there are five electrons in the 3d orbitals, two valence electrons can participate in the redox reaction.

In other words, the $Li_2MnO_3$ has little reactivity as it contains $Mn^{4+}$, but in the case of the $Li_2MnO_2$, it has intrinsically excellent reactivity as the oxidation number of Mn is remarkably reduced.

Therefore, the compound having an orthorhombic layered structure represented by the above Chemical Formula 1 is not only a positive active material capable of realizing high capacity and high energy density, but can also be used in place of $Li_2MnO_3$ in the form of the composite active material, and it is expected to exert excellent effects.

Actually, when a compound having a layer structure represented by Chemical Formula 1 is applied as a positive active material, an initial charging capacity of about 300 mAh/g at about 4.8 V (or less) can be realized. This fact is well supported by Examples 1 and 2 to be described later and the evaluation of Example 2 thereof.

In addition, since each element contained in the compound represented by Chemical Formula 1 is harmless to the environment, the positive active material is based on an environmentally friendly material.

More specifically, as mentioned above, in Chemical Formula 1, x may be in a range of 0.8≤x≤1.2, and specifically in a range of 1≤x≤1.2. In addition, in Chemical Formula 1, y may be in a range of 0.8≤y≤1.2, and specifically in a range of 1≤y≤1.2. When each of these ranges is satisfied, the positive active material may have higher capacity and higher energy density.

More specifically, the x value of the above Chemical Formula 1 is related to the content of lithium, and when the value is close to 1, it means an excess amount of lithium which can realize high capacity. If the value of x in the above Chemical Formula 1 is less than 0.8, the content of lithium is too low to realize high capacity. On the other hand, when the value of x in the above Chemical Formula 1 exceeds 1.2, the content of lithium is too excessive to such an extent that the structure of the compound of Chemical Formula 1 itself becomes unstable, and due to the unstable structure, insertion and desorption of lithium ions is difficult.

In the above Chemical Formula 1, when the y value is close to 1, the above-mentioned orthorhombic layered structure can be formed. However, when the y value is less than 0.8 or more than 1.2 in the above Chemical Formula 1, an entirely different structure can be formed, and in particular, there is a possibility that the lithium ion insertion and desorption would be difficult.

In the above Chemical Formula 1, M may be Mn. Since Mn is a low-cost and abundant material, it is advantageous for mass production of the positive active material.

In this regard, the closer the z value is to 0 in the above Chemical Formula 1, the closer to +2 the oxidation number of Mn becomes, and the better the reactivity becomes. Otherwise, when z is 1 in the above Chemical Formula 1 becomes 1, the above Chemical Formula 1 becomes $Li_2MnO_3$, and as mentioned above, the reactivity as a positive active material is poor.

Another embodiment of the present invention provides a positive active material for a rechargeable lithium battery, which is a compound represented by the following Chemical Formula 2.

$\{_m(Li_{1+x}M_yO_{2+})\}\cdot\{_{1-m}(LiMO_2)\}$ [Chemical Formula 2]

In the above Chemical Formula 2, M is one or more elements selected from the group consisting of Mn, Co, Ni, Al, Ti, Mo, V, Cr, Fe, Cu, Zr, Nb, and Ga, 0.8≤x≤1.2, 0.8≤y≤1.2, −0.2≤z≤0.2, and 0<m≤1.

The compound represented by Chemical Formula 2 corresponds to an over-lithiated positive active material in which the compound having a layer structure represented by Chemical Formula 1 is complexed with a compound represented by $LiMO_2$.

This means that $Li_2MO_3$, which is a main component of the composite positive active material having the composition $\{_m(Li_2MO_3)\}\cdot\{_{1-m}(LiMO_2)\}$ indicated above, is replaced with the compound of Chemical Formula 1. The compound has a lithium content equivalent to that of $Li_2MO_3$, and is excellent in reactivity, which can contribute to realizing high capacity and high energy density of the battery. A more detailed description thereof is as described above.

More specifically, in the above Chemical Formula 2, x may be in range of 0.8≤x≤1.2, y may be in a range of 0.8≤y≤1.2, and M may be Mn. When these ranges are satisfied, the same explanation as described above is applied.

Another embodiment of the present invention provides a method of manufacturing the positive active material for a rechargeable lithium battery, including: preparing Mixture 1 by mixing a compound represented by Chemical Formula 3 and a carbon-based material; and heat-treating the Mixture 1.

$Li_{1+x}M_yO_{3+z}$ [Chemical Formula 3]

In the above Chemical Formula 3, M is one or more elements selected from the group consisting of Mn, Co, Ni, Al, Ti, Mo, V, Cr, Fe, Cu, Zr, Nb, and Ga, 0.8≤x≤1.2, 0.8≤y≤1.2, and −0.2≤z≤0.2.

This is a method of obtaining a positive active material by reducing the compound represented by Chemical Formula 3 by mixing the compound represented by Chemical Formula 3 and the carbon-based material and then performing heat-treating. Since the positive active material is obtained by such a relatively simple process, it can be evaluated as an advantageous method for mass production.

Specifically, the description of the step of preparing the Mixture 1 is as follows.

As described above, the Mixture 1 can be prepared by mixing the compound represented by Chemical Formula 3 and the carbon-based material. At this time, the carbon-based material includes carbon and is not particularly limited as long as it is a material capable of reducing the compound represented by Chemical Formula 3. In the following examples, carbon powder was used as the carbon-based material.

In the above Mixture 1, the weight ratio of the compound represented by the above Chemical Formula 3 to carbon (C) in the above carbon-based material may be in a range of 1:0.001 to 1:0.050. When this range is satisfied, the compound represented by the above-mentioned Chemical Formula 3 is reduced in the heat-treating step described later to obtain a compound having a layer structure represented by the following Chemical Formula 4.

However, when the above range is not satisfied and the amount of the compound represented by Chemical Formula 3 is excessive, the reduction may be insufficient, so that it may be difficult to obtain the target material. In contrast, when the above range is not satisfied and only a small amount of the compound represented by the Chemical Formula 3 is contained, impurities may be formed in the final product as the carbon-based material is contained in an excessive amount.

In addition, the Mixture 1 may be prepared by mixing the compound represented by Chemical Formula 3 and the carbon-based material by a solid-phase mixing method.

The step of heat-treating the Mixture 1 is explained as follows.

The step of heat-treating may be performed at about 300 to about 1000° C. When the compound is heat-treated in the above-mentioned temperature range, the compound represented by the Chemical Formula 3 is reduced to obtain a compound having an orthorhombic layered structure represented by the following Chemical Formula 4.

However, there is a problem that a side reaction may occur when heat-treating is performed in a temperature range exceeding 1000° C., and when the heat-treating is performed in a temperature range of less than 300° C., the reduction may be insufficiently performed.

Independently, the step of heat-treating the Mixture 1 may be performed for about 3 to about 40 hours. When the step of heat-treating is performed within the above range, the compound represented by Chemical Formula 3 may be reduced to obtain a compound having a layer structure represented by below Chemical Formula 4.

However, when the step of heat-treating is performed for a long period of time exceeding 40 hours, there may be a problem of transition to another phase, and when the step of heat-treating is performed for a short time of less than 3 hours, the reduction may be insufficiently performed.

By the step of heat-treating the Mixture 1, the compound represented by the above Chemical Formula 3 may be reduced to obtain a compound having an orthorhombic layered structure represented by the following Chemical Formula 4.

$Li_{1+x}M_yO_{2+z}$ [Chemical Formula 4]

In the above Chemical Formula 4, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, and $-0.2 \leq z \leq 0.2$.

The material obtained by the heat-treating is the same as the compound of the orthorhombic layered structure represented by the above-mentioned Chemical Formula 1.

More specifically, the step of heat-treating the Mixture 1 may be performed in a temperature range of about 600 to about 900° C. and in a reducing atmosphere for about 3 to about 20 hours.

After the above step of heat-treating the Mixture 1, the steps of preparing Mixture 2 by mixing the compound having a layer structure represented by Chemical Formula 4 with the lithium metal compound, and the step of heat-treating the Mixture 2 to obtain an over-lithiated positive active material, may be included.

This corresponds to a simple process of mixing a compound having a layer structure represented by Chemical Formula 4 with another lithium metal compound and then performing heat-treating, and it is evaluated that the obtained over-lithiated positive active material can further improve the performance of the battery as compared with the compound having a layer structure represented by Chemical Formula 4.

Specifically, the lithium metal compound may be a compound having a layer structure represented by the following Chemical Formula 5.

$LiMO_2$ [Chemical Formula 5]

In the above Chemical Formula 5, M is one or more elements selected from the group consisting of Mn, Co, Ni, Al, Ti, Mo, V, Cr, Fe, Cu, Zr, Nb, and Ga.

More specifically, the description of the step of heat-treating the Mixture 2 to obtain an over-lithiated positive active material is as follows.

In the Mixture 2, the weight ratio of the compound having a layer structure represented by the above Chemical Formula 4 to the above lithium metal compound may be 1:0.001 to 0.001:1. When the Mixture 2 satisfying this range is heat-treated, the compound having a layer structure represented by the above-mentioned Chemical Formula 5 may be obtained.

Meanwhile, the step of heat-treating the Mixture 2 to obtain an over-lithiated positive active material may be performed at about 300 to about 1000° C. When the step of heat-treating is performed in the temperature range described above, a compound having a layer structure represented by the following Chemical Formula 6 may be obtained.

The step of heat-treating the Mixture 2 may be performed for about 3 to about 40 hours. When subjected to heat-treating within the above-mentioned range, a compound having a layer structure represented by the following Chemical Formula 6 may be obtained.

By the above step of heat-treating the Mixture 2, a compound having a layer structure represented by the following Chemical Formula 6 may be obtained as the above over-lithiated positive active material.

$\{m(Li_{1+x}M_yO_{2+z})\} \cdot \{1-m(LiMO_2)\}$ [Chemical Formula 6]

In the above Chemical Formula 6, M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, $-0.2 \leq z \leq 0.2$, and $0 < m \leq 1$.

This is the same as the compound having a layer structure represented by the above-mentioned Chemical Formula 2.

Another embodiment of the present invention provides a rechargeable lithium battery including: a positive electrode including the positive active material for the rechargeable lithium battery of any one mentioned above; a negative electrode; and an electrolyte.

This corresponds to a rechargeable lithium battery having improved electrochemical performance by applying the positive active material for the rechargeable lithium battery. The effect of such a performance improvement can be confirmed by the following examples and evaluation of examples thereof.

Hereinafter, elements constituting the rechargeable lithium battery other than the positive active material will be described in detail.

Specifically, the positive electrode includes a current collector, and a positive active material layer disposed on the current collector.

The positive electrode may be produced, for example, by forming the positive active material composition containing a positive active material, a conductive material, a binder, and the like into a predetermined shape, or by applying the positive active material composition to a current collector such as an aluminum foil.

Specifically, a positive active material composition is prepared by mixing a positive active material, a conductive material, a binder, and a solvent. The positive active material composition is coated directly on the metal current collector to produce a positive electrode plate. Alternatively, the positive active material composition may be cast on a separate support, and then a film peeled off from the support may be laminated on the metal current collector to produce a positive electrode plate. The positive electrode is not limited to the above-described form, and may be in a form other than the above-described form.

In addition to the above-mentioned positive active material, the positive active material may include at least one other technical feature such as the composition, particle size, and the like. In addition, a conventional positive active material known in the technical field of this invention may be included with the positive active material.

The conventional positive active material may include at least one selected from the group consisting of lithium cobalt oxide, lithium nickel cobalt manganese oxide, lithium nickel cobalt aluminum oxide, lithium iron phosphate, and lithium manganese oxide, but is not limited thereto, and any positive active material available in the technical field of this invention may be additionally used.

For example, $Li_aA_{1-b}B_bD_2$ (wherein $0.90 \leq a \leq 1.8$ and $0 \leq b \leq 0.5$); $Li_aE_{1-b}B_bO_2$ (wherein $0.90 \leq a \leq 1.8$ and $0 \leq b \leq 0.5$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_2$ (wherein $0.90 \leq a \leq 1.8$, $0 \leq b \leq 0.5$, and $0 \leq c \leq 0.05$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_2$ (wherein $0.90 \leq a \leq 1.8$, $0 \leq b \leq 0.5$, and $0 \leq c \leq 0.05$); $Li_aNi_bE_cG_dO_2$ (wherein $0.90 \leq a \leq 1.8$, $0.5 \leq b \leq 0.9$, $0 \leq c \leq 0.5$, and $0.001 \leq d \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); and $Li_aMnG_bO_2$ (wherein $0.90 \leq a \leq 1.8$ and $0.001 \leq b \leq 0.1$) may be used.

In the above formulas, A is Ni, Co, Mn, or a combination thereof; B is Al, Ni, Co, Mn, Cr, Fe, Mg, Sr, V, a rare earth element, or a combination thereof; D is O; E is Co, Mn, or a combination thereof; and G is Al, Cr, Mn, Fe, Mg, La, Ce, Sr, V, or a combination thereof.

Of course, those having a coating film on the surface of the compound may be used, or a compound having a coating film mixed with the above-mentioned compound may be used. The coating film may include a coating element compound of an oxide, a hydroxide, an oxyhydroxide, and an oxycarbonate of the coating element, or a hydroxycarbonate of the coating element. The compound constituting these coating films is crystalline. As the coating element included in the coating film, Al, Si, Ti, etc. may be used. The coating film forming process may be any coating method as long as the compound can be coated by a method that does not adversely affect physical properties of the positive active material (for example, spray coating, dipping, etc.) by using these elements, which will be understood people in this technical field, so a detailed description thereof will be omitted.

For example, $LiNiO_2$, $LiNi_{1-x}Mn_xO_2$ ($0 < x < 1$), $LiNi_{1-x-y}Co_xMn_yO_2$ ($0 \leq x \leq 0.5$ and $0 \leq y \leq 0.5$), and the like may be used.

As the conductive material, carbon black, graphite fine particles, or the like may be used, but it is not limited thereto, and any conductive material known in the related technical field may be used. For example, conductive materials such as graphite such as natural graphite or artificial graphite; carbon black; acetylene black; and Ketjen black may be used.

The binder may be a vinylidene fluoride/hexafluoropropylene copolymer, polyvinylidene fluoride (PVDF), polyacrylonitrile, polymethyl methacrylate, polytetrafluoroethylene, and mixtures thereof, or styrene butadiene rubber-based polymers, etc. may be used, but are not limited thereto, and may be used as long as they are used as bonding agents in this technical field.

The solvent may be N-methylpyrrolidone, acetone, water, or the like, but not limited thereto, and any solvent which can be used in this technical field may be used.

The content of the positive active material, the conductive material, the binder, and the solvent is of a level commonly used in a rechargeable lithium battery. Depending on the application and configuration of the rechargeable lithium battery, one or more of the conductive material, the binder, and the solvent may be omitted.

Next, a negative active material composition is prepared by mixing a negative active material, a conductive material, a binder, and a solvent. The negative active material composition is directly coated on the metal current collector and dried to produce a negative electrode plate. Alternatively, the negative active material composition may be cast on a separate support, and then a film peeled off from the support may be laminated on the metal current collector to produce a negative electrode plate.

The negative active material is not particularly limited, and is generally used in this technical field. More specifically, lithium metal, a metal capable of alloying with lithium, a transition metal oxide, a transition metal sulfide, a material capable of doping and dedoping lithium, a material capable of reversibly intercalating and deintercalating lithium ions, a conductive polymer, and the like may be used.

As a conductive material, a binder, and a solvent in the negative active material composition, the same materials as those of the positive active material composition may be used. It may be possible to add a plasticizer to the positive active material composition and/or the negative active material composition to form pores in the electrode plate.

The content of the negative active material, the conductive material, the binder, and the solvent is also of a level commonly used in a rechargeable lithium battery. Depending on the application and configuration of the rechargeable lithium battery, one or more of the conductive material, the binder, and the solvent may be omitted.

Figure 1:
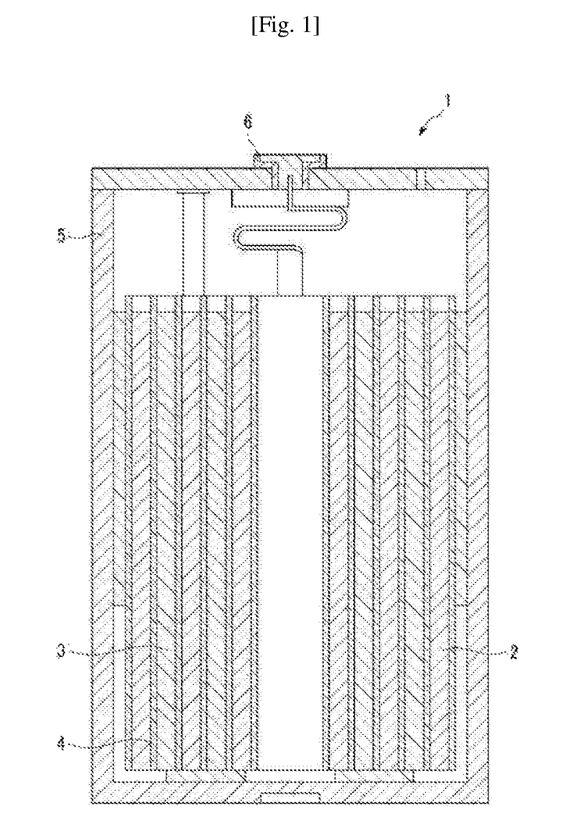
FIG. 1 is a schematic view showing a rechargeable lithium battery according to one embodiment.

FIG. 1 is a typical schematic view showing a rechargeable lithium battery. Specifically, the rechargeable lithium battery (1) includes a battery container (5) including a positive electrode (3), a negative electrode (2), an electrolyte solution impregnated in a separator (4) existing between the positive electrode (3) and the negative electrode (2), and a sealing member (6) for sealing the battery container (5).

The following examples illustrate the present invention in more detail. However, it is understood that the present invention is not limited by these examples.

Example 1: Preparation of Positive Active Material for Rechargeable Lithium Battery A compound having an orthorhombic layered structure represented by $Li_2MnO_2$ was synthesized as a positive active material for a rechargeable lithium battery according to an embodiment. To this end, according to another embodiment, a compound represented by $Li_2MnO_3$ was synthesized and then heat-treated with carbon powder. The specific process is as follows.

(1) Synthesis of $Li_2MnO_3$

First, lithium hydroxide (LiOH, purchased from Sigma Aldrich) and manganese carbonate ($MnCO_3$, purchased from Sigma Aldrich) were mixed in a solid phase such that the molar ratio of Li:Mn was about 2:1, and then the mixture treated for about 40 hours at 850° C. After annealing, the mixture cooled to room temperature, and then a lithium manganese oxide with the chemical formula $Li_2MnO_3$, was obtained.

(2) Reduction of $Li_2MnO_3$

The obtained $Li_2MnO_3$ was solid-phase mixed with carbon powder (carbon powder purchased from Timcal) so that the weight ratio of $Li_2MnO_3$:Mn was about 1:0.012, and then heat-treated in a reducing atmosphere (Ar gas atmosphere) at about 700° C. for about 10 hours.

As a result, the $Li_2MnO_3$-reduced material, $Li_2MnO_2$, could be obtained as a positive active material. The composition of the obtained positive active material was confirmed in evaluations of examples described later.

Example 2: Manufacture of a Positive Electrode and a Rechargeable Lithium Battery (Half Coin Cell)

A positive electrode was prepared by applying the positive active material of Example 1, and then a rechargeable lithium battery including the above-prepared positive electrode was prepared.

Specifically, the positive active material, the conductive material (Super-P, Denka black), and the binder (PVdF) of Example 1 were mixed in an organic solvent (NMP) at a weight ratio of 8:1:1 (positive active material:conductive material:binder) to prepare a positive active material slurry, and then the above positive active material slurry was coated on an aluminum current collector and vacuum-dried in a vacuum oven at about 120° C. for about 12 hours to prepare a positive electrode.

Lithium metal was used as a counter electrode, and as the electrolyte, about 1.3 mol of a $LiPF_6$ solution was dissolved in a mixed solvent of a 3:7 volume ratio of ethylene carbonate (EC):ethyl methyl carbonate.

A 2032 half coin cell was fabricated using each of the above components according to a conventional manufacturing method.

Comparative Example 1: Positive Active Material for Rechargeable Lithium Battery $Li_2MnO_3$ synthesized in Example 1 was used as the positive active material of Comparative Example 1.

Comparative Example 2: Manufacture of a Positive Electrode and a Rechargeable Lithium Battery (Half Coin Cell)

A positive electrode and a rechargeable lithium battery (half coin cell) were prepared in the same manner as in Example 2, except that the positive active material of Comparative Example 1 was used in place of the positive active material of Example 1.

Evaluation of Example 1: Characteristics of Positive Active Material for Rechargeable Lithium Battery (1) X-Ray Diffraction (XRD) Pattern Analysis For the positive active material of Example 1, X-ray diffraction (XRD) patterns were analyzed in order to understand the structural characteristics thereof. Specifically, XRD analysis was performed under the conditions of a scan rate of about 0.03 and about 0.5 seconds in a 2 theta range of about 10 to about 80 degrees using X-ray diffraction (1.5418, 40 kV/40 mA), and the results are shown in FIG. 2.

Figure 2:
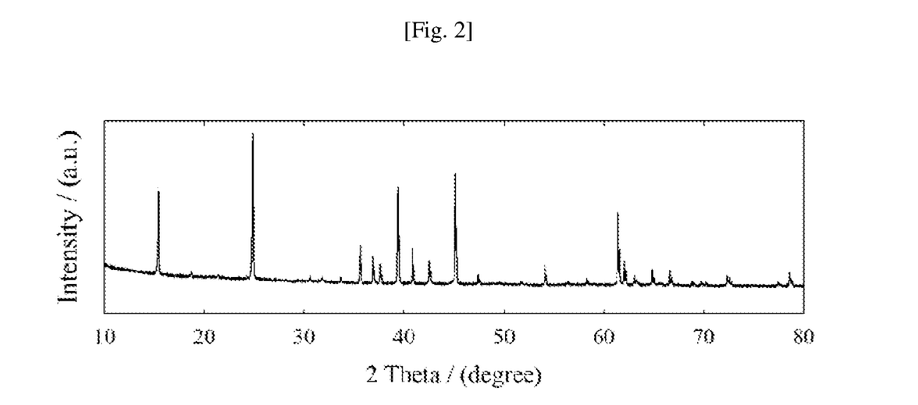
FIG. 2 shows an X-ray diffraction (XRD) pattern analysis result of a positive active material for a rechargeable lithium battery according to an embodiment.

Referring to FIG. 2, it is seen that the positive active material of Example 1 is an orthorhombic layered structure having a Pmnm space group. This could be confirmed by comparison with the crystal structure of $LiMnO_2$.

Specifically, the crystal structure of $LiMnO_2$ is widely known to be an orthorhombic layered structure having a Pmnm space group. This $LiMnO_2$ (JCPDS 01-072-0411) was subjected to XRD analysis under the same conditions as above, and the results are shown in FIG. 3.

Figure 3:
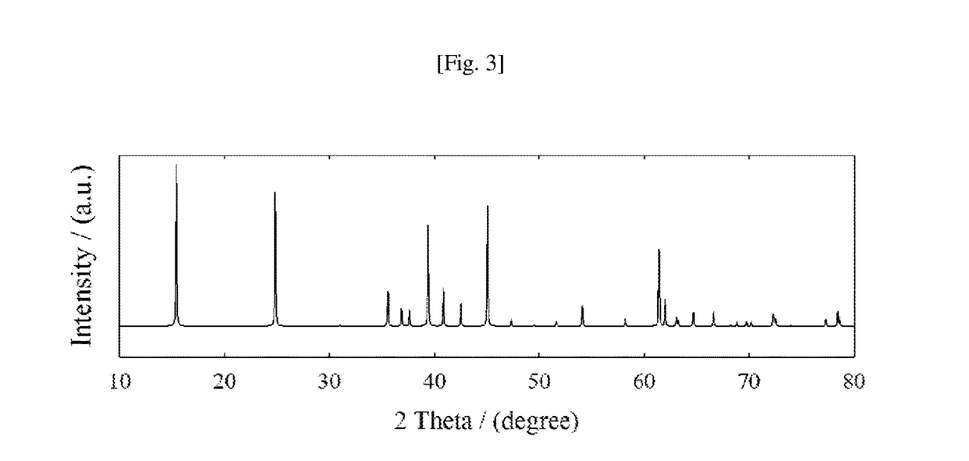
FIG. 3 shows X-ray diffraction (XRD) pattern analysis on $LiMnO_2$, which is known to have an orthorhombic layered structure.

Comparing FIG. 2 (Example 1) and FIG. 3 ($LiMnO_2$), the positions of the peaks are the same, and it is estimated that the positive active material of Example 1 has the same orthorhombic crystal structure as $LiMnO_2$.

However, a small difference appears in terms of the intensity of each peak, which is expected to result from the fact that the positive active material of Example 1 contains more Li than $LiMnO_2$. In order to confirm that this prediction is valid, the following inductively coupled plasma mass spectrometry was performed.

(2) Inductively Coupled Plasma—Mass Spectrometry

Figure 4:
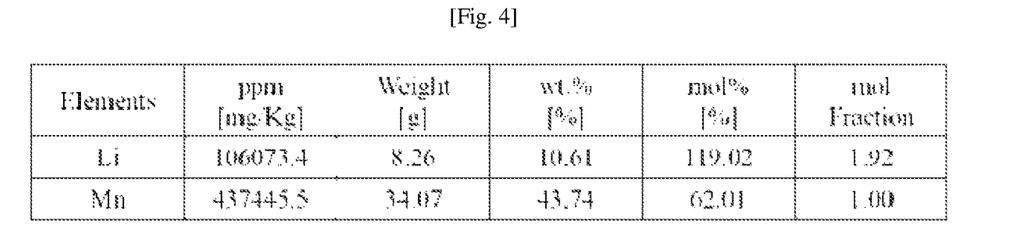
FIG. 4 shows X-inductively coupled plasma mass spectrometric analysis of a positive active material for a rechargeable lithium battery according to one embodiment.

For the positive active material of Example 1, analysis was conducted using an inductively coupled plasma mass spectrometer in order to specifically determine the content of lithium, and the results are shown in FIG. 4.

As per FIG. 4, the lithium content in the positive active material of Example 1 was analyzed to be close to 2 mol. Considering this analysis result together with the XRD pattern of FIG. 1, the positive active material of Example 1 is $Li_2MnO_2$ containing 2 mol of Li, and its crystal structure can be estimated to be an orthorhombic layered structure.

Figure 5:
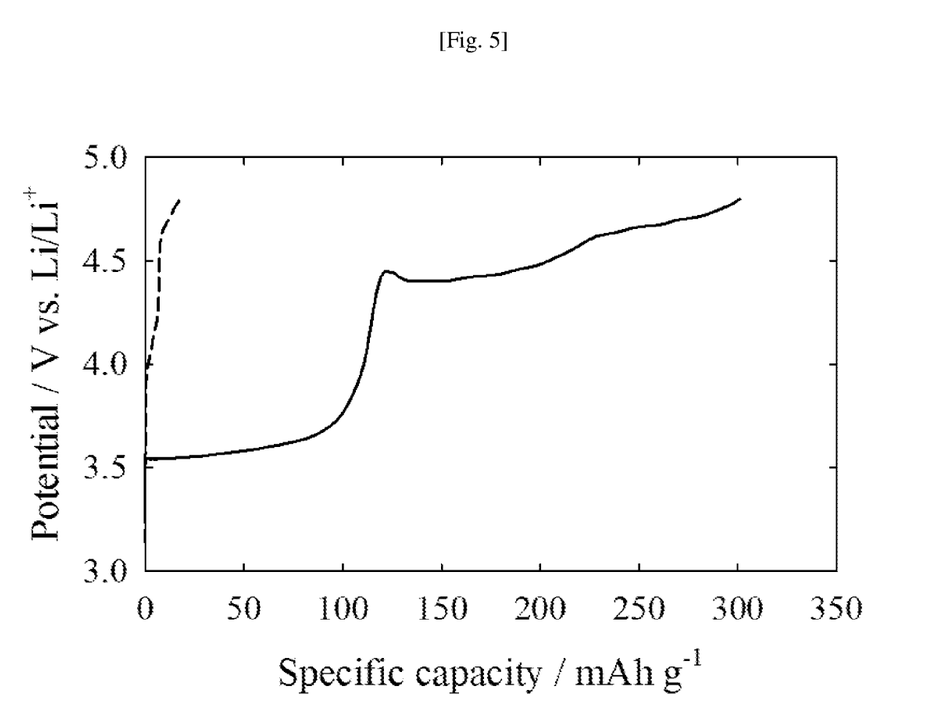
FIG. 5 shows the results of performance evaluation of each rechargeable lithium battery according to one embodiment and one comparative example.

Evaluation of Example 2: Performance Evaluation of Rechargeable Lithium Battery Each of the rechargeable lithium batteries of Example 2 and Comparative Example 2 was subjected to constant current charging at a current of about 13 mA/g at room temperature (25° C.) until the voltage reached about 4.8 V (vs. Li), and the results are shown in FIG. 5. Specifically, the result indicated by a dotted line in FIG. 5 is based on Comparative Example 2, and the result indicated by a solid line is based on Example 2.

According to FIG. 5, it was confirmed that the rechargeable lithium battery of Example 2 had excellent charging capacity exceeding 300 mAh/g, which was 10 or more times higher than that of Comparative Example 2. It can also be estimated that the difference in charge capacity is due to the positive active material applied to each rechargeable lithium battery.

That is, the positive active material of Example 1 had a lithium content as high as that of $Li_2MnO_3$, which is the positive active material of Comparative Example 2, as $Li_2MnO_2$ having an orthorhombic layered structure, as confirmed in (2) of the evaluation of Example 1, the reactivity is much better and can be evaluated as contributing to improvement of the charging capacity of the battery.

Further, in the potential region of the evaluation conditions, it was estimated that about 70% of lithium in 2 mol of lithium contained in the positive active material of Example 1 could participate in the reaction.

Therefore, the positive active material of Example 1, that is, $Li_2MnO_2$ having an orthorhombic layered structure, is not only a positive active material capable of realizing high capacity and high energy density, but it is also estimated to realize excellent effects when it is implemented as an over-lithiated positive active material and replaced with $Li_2MnO_3$ in the composite positive active material having a form of $\{_m(Li_2MO_3)\}\cdot\{_{1-m}(LiMO_2)\}$.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A positive active material for a rechargeable lithium battery having a layer structure represented by the following Chemical Formula 1:

$$Li_{1+x}M_yO_{2+z} \qquad \text{[Chemical Formula 1]}$$

wherein, in the above Chemical Formula 1,

M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, and $-0.2 \leq z \leq 0.2$, and wherein the layer structure is an orthorhombic layered structure having a Pmnm space group.

2. The positive active material for a rechargeable lithium battery of claim 1,
wherein, in the above Chemical Formula 1, $1 \leq x \leq 1.2$.

3. The positive active material for a rechargeable lithium battery of claim 1,
wherein, in the above Chemical Formula 1, $1 \leq y \leq 1.2$.

4. The positive active material for a rechargeable lithium battery of claim 1,
wherein, in the above Chemical Formula 1, M is Mn.

5. A positive active material for a rechargeable lithium battery having a layer structure represented by the following Chemical Formula 2:

$$\{_m(Li_{1+x}M_yO_{2+z})\}\cdot\{_{1-m}(LiMO_2)\} \qquad \text{[Chemical Formula 2]}$$

wherein, in the above Chemical Formula 2,

M is one or more elements selected from the group consisting of Mn, Co, Ni, Al, Ti, Mo, V, Cr, Fe, Cu, Zr, Nb, and Ga, $0.8 \leq x \leq 1.2$, $0.8 \leq y \leq 1.2$, $-0.2 \leq z \leq 0.2$, and $0 < m \leq 1$, and wherein the layer structure is an orthorhombic layered structure having a Pmnm space group.

6. The positive active material for a rechargeable lithium battery of claim 5,
wherein, in the above Chemical Formula 2, $1 \leq x \leq 1.2$.

7. The positive active material for a rechargeable lithium battery of claim 5,
wherein, in the above Chemical Formula 2, $1 \leq y \leq 1.2$.

8. The positive active material for a rechargeable lithium battery of claim 5,
wherein, in the above Chemical Formula 2, M is Mn.

* * * * *